United States Patent
Shepard et al.

(10) Patent No.: US 7,441,705 B2
(45) Date of Patent: *Oct. 28, 2008

(54) SCAN MODULE

(75) Inventors: Howard Shepard, Great River, NY (US); Mark Drzymala, Commack, NY (US); Edward Barkan, Miller Place, NY (US); Heng Zhang, Holbrook, NY (US); Vladimir Gurevich, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 11/857,776

(22) Filed: Sep. 19, 2007

(65) Prior Publication Data

US 2008/0006697 A1    Jan. 10, 2008

Related U.S. Application Data

(60) Division of application No. 11/071,002, filed on Mar. 3, 2005, now Pat. No. 7,281,658, which is a continuation-in-part of application No. 11/047,240, filed on Jan. 31, 2005, now Pat. No. 7,207,489.

(51) Int. Cl.
G06K 7/10    (2006.01)
(52) U.S. Cl. ..................................... 235/454
(58) Field of Classification Search .................. 235/454
See application file for complete search history.

(56) References Cited

U.S. PATENT DOCUMENTS

2004/0050937 A1*    3/2004    Barkan .................. 235/462.36

* cited by examiner

*Primary Examiner*—Karl D. Frech
*Assistant Examiner*—Tae W Kim
(74) *Attorney, Agent, or Firm*—Fay Kaplun & Marcin, LLP

(57) ABSTRACT

A scan module includes a scan motor, a laser; a sensor; and a mirror module. The mirror module includes (a) a collection mirror having an opening and (b) a fold mirror having a first end physically coupled to the collection mirror. A second end of the fold mirror is separated by a gap from the collection mirror.

14 Claims, 7 Drawing Sheets

SCAN MODULE

REFERENCE TO RELATED APPLICATIONS

This application is a divisional of U.S. patent application Ser. No. 11/071,002 entitled "Scan Motor" filed on Mar. 3, 2005 issued as U.S. Pat. No. 7,281,658, which is a Continuation-in-part application of U.S. patent application Ser. No. 11/047,240 filed Jan. 31, 2005 entitled "Scan Motor" issued as U.S. Pat. No. 7,207,489.

FIELD OF THE INVENTION

The invention is directed to laser scanners and, more particularly to a scan module.

BACKGROUND OF THE INVENTION

There are numerous standards for encoding numeric and other information in visual form, such as the Universal Product Codes (UPC) and/or European Article Numbers (EAN). These numeric codes allow businesses to identify products and manufactures, maintain vast inventories, manage a wide variety of objects under a similar system and the like. The UPC and/or EAN of the product is printed, labeled, etched, or otherwise attached to the product as a dataform.

Dataforms are any indicia that encode numeric and other information in visual form. For example, dataforms can be barcodes, two dimensional codes, marks on the object, labels, signatures, signs etc. Barcodes are comprised of a series of light and dark rectangular areas of different widths. The light and dark areas can be arranged to represent the numbers of a UPC. Additionally, dataforms are not limited to products. They can be used to identify important objects, places, etc. Dataforms can also be other objects such as a trademarked image, a person's face, etc.

Scanners that can read and process the dataforms have become common and come in many forms and varieties. One embodiment of a scanning system resides, for example, in a hand-held gun shaped, laser scanning device. A user can point the head of the scanner at a target object and press a trigger to emit a light beam that is used to read, for example, a dataform, on the object.

In an embodiment, semiconductor lasers are used to create the light beam because they can be small in size, they are low in cost and they do not require a lot of power. One or more laser light beams can be directed by a lens or other optical components along a light path toward an object that includes a dataform. The light path comprises a pivoting scan mirror that sweeps the laser light back and forth across the object and/or dataform. The mirror can be part of a scan motor comprising a spring, and a permanent magnet. The magnet is positioned in the vicinity of a drive coil, which oscillates the scan motor. There are numerous other known methods of sweeping the laser light, such as moving the light source itself or illuminating a plurality of closely spaced light sources in sequence to create a sweeping scan line. The scanner can also create other scan patterns, such as, for example, an ellipse, a curved line, a two or three dimensional pattern, etc.

The scanner also comprises a sensor or photodetector for detecting light reflected or scattered from an object and/or dataform. The returning light is then analyzed to obtain data from the object or dataform. Two known scan systems for collecting light are retroreflective scan systems and non-retroreflective scan systems.

In retroreflective scan systems, the same pivoting scan mirror that sweeps the laser light to form a scan line, also receives the light that returns to the scanner. The mirror's surface is made as large as possible to capture as much returning light as possible. The returning light is directed towards a sensor, such as for example, a photodiode, that emits electrical signals corresponding to the returning light. The returning light can be concentrated on the sensor using, for example, a parabolic shaped collection mirror, or in other embodiments the mirror can have a spherical or some other shape. Data is obtained from a targeted dataform by interpreting the electrical signals. The sensor can be relatively small since the field of view of the scanner is dynamic and the instantaneous field of view of the scanner is relatively small. An exemplary retroreflective scan system is described in U.S. Pat. No. 6,360,949, which is owned by the assignee of the instant invention and is incorporated by reference.

The performance of a retroreflective scan system is related to the scan system's collection area, i.e., the available area the scan system has to collect returning light. The more collection area the scan system has, the higher the scan system's performance will be. For example, a larger collection area can increase the range of the scan system and/or improve the scanning of lower contrast dataforms. The collection area for a scan system is determined by many factors including the area of the collection mirror, the area of the scan mirror, the angle of the scan mirror with respect to the front of the scan system, the size and location of the fold mirror, obstructions in the optical path, etc.

In non-retroreflective scan systems, the scan mirror that pivots to create a scan line is not used to receive light returning from a target dataform. Since the pivoting scan mirror does not have to receive returning light, it can be relatively small. Instead of using a large collection mirror and a small sensor to receive returning light, the scanner comprises a relatively large sensor that detects the returning laser light across its field of view. Since the field of view of the scanner is not dependant on the scan mirror, the sensor can be positioned below the source of the scan line. An exemplary non-retroreflective scan system is described in U.S. Pat. No. 6,592,040, which is owned by the assignee of the instant invention and is incorporated by reference.

Known non-retroreflective scan systems use scan motors created by an injection molding (IM) process, as described in U.S. Pat. No. 6,817,529, which is owned by the assignee of the instant invention and is incorporated by reference. In an exemplary embodiment, the scan motor comprises injection molded substrates and liquid injection molded (LIM) springs. The springs can be made of silicone, which provide shock protection. Additionally, the injection molded scan motor can be made at relatively low costs. Non-retroreflective scan systems are good candidates for injection molded scan motors because those systems use small mirrors, and small mirrors yield low inertia and low driving voltages. Since a retroreflective system uses a relatively large mirror, LIM scan motors have not been used since the drive voltages would be too high. Known retroreflective systems use scan motors that have springs made of mylar and/or metal. These materials do not have the cost and shock benefits of a material such as silicone.

Accordingly, there is a desire for a scan motor that can also be used in a retroreflective system that is durable, resistant to shocks and can be produced at low costs. Additionally, there is a desire for injection molded scan motors for non-retroreflective systems that use less power.

Although, retroreflective scan systems use collection mirrors that are relatively large, the overall volume of a retroreflective scan system can be very small, for example, 0.200 in$^3$. A retroreflective scan system or more specifically a scan engine can be implemented as part of another device, such as, for example a handheld computer or handheld scanner. Since the devices that scan engines are found in are continuously shrinking, the scan engines included in the devices should be as small as possible, while providing adequate performance. In addition, it might not be possible to alter the shape of the scan engine to optimized internal volume, because an industry standard scan engine shape exists.

Because of the limited available volume, known small retroreflective scan engines might have sacrificed some collection area for other necessary features. For example, a relatively large scan motor, the angle of a scan mirror and/or the position of a fold mirror can reduce the collection area of a scan engine. Alternatively, a greater collection area might be obtained by optimizing or increasing the available internal area of a scan engine by changing its shape. Unfortunately, this may not be desirable since industry standards may exists with respect to the shape of a scan engine. Additionally, it is desirable for new scan engines to fit into existing devices.

Accordingly, there is a desire for a retroreflective scan system, with a large collection area, that can improve scan performance, reduce manufacturing costs and increase durability. Additionally, there is a desire for improvements in larger scan systems using designs developed for smaller scan systems.

SUMMARY OF THE INVENTION

The invention as described and claimed herein satisfies this and other needs, which will be apparent from the teachings herein.

An exemplary scan module implemented in accordance with the invention comprises a chassis, a drive coil, a scan motor, a laser, a mirror module and a sensor. The mirror module can comprise a collection mirror comprising an opening, and a fold mirror that extends from the collection mirror. The fold mirror can extend behind the collection mirror. Exemplary scan modules can be a scan engine and/or a scan module of a handheld scanner, a portable computer, etc.

An exemplary scan motor that can be used with the exemplary scan module comprises a spring module, a magnet and a reflective element. The spring module comprises a static substrate and a dynamic substrate that are coupled together by a molded flexible spring. In one exemplary embodiment, the substrates are made of thermo plastic and the spring is made of silicone. The spring is relatively small in size and can reduce the power required to drive the scan motor. Additionally, the scan motor can be made at low costs and has very good shock protection.

The dynamic substrate comprises an extending member comprising a first side and a second side. A magnet is coupled to the first side of the extending member and a reflective element, such as, for example, a mirror is coupled to the second side of the extending member. The reflective element is relatively large in size and extends beyond the static substrate and/or the dynamic substrate. In an embodiment of the invention, the scan motor comprises a pair of liquid injection molded (LIM) silicone springs and the extending member is positioned between the springs.

A method of scanning, implemented in accordance with the invention comprises driving a scan motor, for example by exciting a drive coil positioned opposite the magnet of the scan motor, directing a laser beam towards the reflective element of the scan motor using a fold mirror that is part of a mirror module and creating a scan pattern. A scanner user can aim the scan pattern over a dataform, for example, over a barcode, and read the information displayed in the dataform. The scanner concentrates light retuning from the dataform towards a sensor, which analyzes the light and reads the dataform. The light can be concentrated by a collection mirror or lens that is part of the mirror module.

Other objects and features of the invention will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

DETAILED DESCRIPTION OF EXEMPLARY EMBODIMENTS

Figure 1:
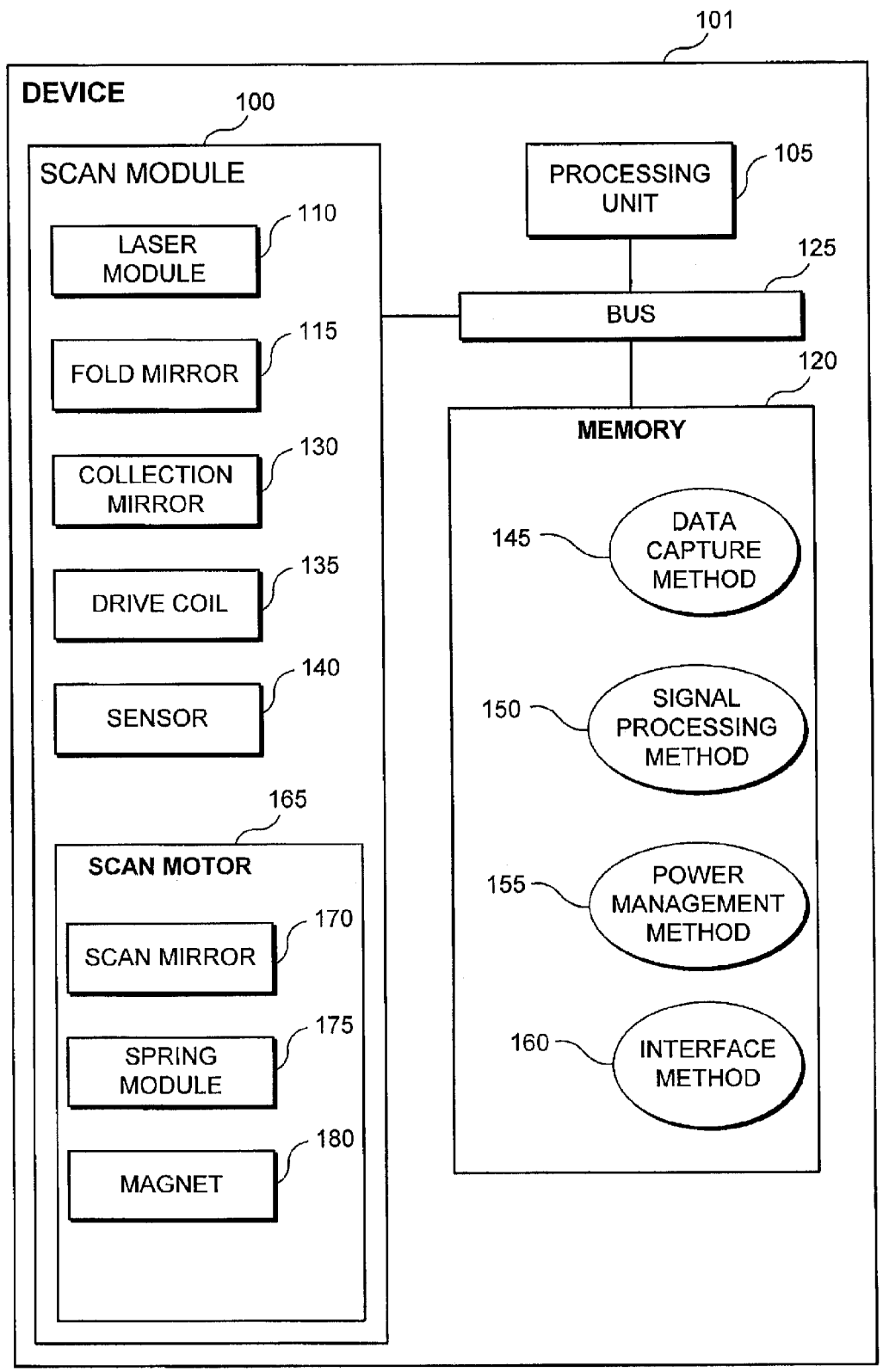
FIG. 1 illustrates a block diagram of an exemplary device implemented in accordance with an embodiment of the invention.

There will now be shown and described in connection with the attached drawing figures several exemplary embodiments of methods and apparatus for providing a scan module.

Shrinking scanning devices, such as handheld computers or mobile scanners comprise small scan modules for reading dataforms. Therefore, there is a desire to increase the performance of small scan modules, while reducing manufacturing costs. An exemplary scan module, implemented in accordance with the invention, that comprises a single piece mirror module has an increased collection area and a reduced manufacturing cost while maintaining an industry standard size.

Other embodiments of the invention comprise a scan motor with a molded assembly. It is beneficial to have non-retroreflective and retroreflective scan systems comprising a scan motor with excellent shock protection and a minimum number of parts to reduce the cost of the scan motor. For example, some technical specification require shock protection from drops of 6 feet or more when the scan systems are incorporated into an end product, such as, for example, a scanner or a terminal. The injection molded spring module or assembly of the scan motor of the non-retroreflective scan system described in U.S. Pat. No. 6,817,529, which is owned by the assignee of the instant invention, provides excellent shock protection and can be made at low cost, but the spring assembly's size and power requirements do not make it a good alternative for some smaller sized retroreflective scan systems.

In an embodiment of the invention, a reduced sized injection molded spring assembly can be used in a scan motor for a non-retroreflective or a retroreflective scan system or module. The exemplary spring assembly comprises a static substrate and a dynamic substrate that can be coupled together by a flexible spring. An exemplary static substrate can be, for example, an injection molded thermoplastic material that can be secured to a chassis of a scan engine and remains static with respect to the scan engine. The dynamic substrate can also be, for example, an injection molded thermoplastic material.

In an embodiment of the invention, the substrates are coupled together by a flexible spring made of LIM or any other injection moldable material, such as, for example, silicone. In alternate embodiments, any material that can have flexible properties can be used to make the spring. The substrates can be coupled together using a multiple shot molding process, such as, for example, an over mold process. LIM material provides excellent shock protection because it can withstand substantial elongation before failure. This property allows any shock event, such as, for example, a drop from six feet, to significantly lower g-levels by stretching out the shock event in time. Since the amount of energy in a shock event is determined by the g-level and the duration of the event, i.e., the amount of energy in the shock event is equal to the area under a curve of g-level vs. time, a shock event for a LIM material is long in time and has a much lower g-level. Other spring materials, such as, for example, mylar or metal springs, do not absorb shock as well as a LIM material since those materials do not have much elongation before failure.

In an alternate embodiment, the dynamic substrate and the spring can be molded as one piece using the same material. The working portion of the spring is made sufficiently small and/or thin to improve efficiency and to meet volume requirements of small scan engines. The dynamic substrate also comprises an extending member that extends towards the static substrate. In an embodiment, the extending member has a wedge-like shape that grows wider as it extends towards the static substrate.

An exemplary scan motor comprises a spring assembly, a mirror and a magnet. The mirror is positioned next to the spring or springs rather than between a pair of springs. The extending member of the dynamic substrate receives a mirror on a first side and a magnet on a second side, and their angles relative to the spring can be manipulated by adjusting the size and/or the angle of inclination of the receiving sides of the wedge shaped extending member. Thus, the plane in which the mirror lies can be at any angle relative to the plane in which the spring or springs lie, and the plane in which the magnet lies can also be at any angle relative to the plane in which the spring or springs lie. The extending member of the dynamic substrate comprises a cradle on its first side to receive the large mirror, and the mirror comprises a receiving structure for coupling to the cradle. The magnet is bonded, for example, using an adhesive, to the second side of the extending member.

In known non-retroreflective scan systems, a relatively small mirror is coupled to an injection molded spring assembly between a pair of springs. Retroreflective systems use relatively large mirrors. Therefore, the mirror of the exemplary reduced sized injection molded spring assembly is positioned to the side of the springs, rather than between a pair of springs. This allows the spring assembly to receive a mirror that can be larger than the space between the springs. Additionally, positioning the mirror next to the springs creates a low moment of inertia, which helps to keep the operating power of the scan engine low. Power savings are also created by reducing the size of the spring assembly. The power saving from reducing the size of the spring assembly can also be applied to a non-retroreflective scan system that has been modified to receive a smaller spring assembly.

In an exemplary scan module, the scan motor is positioned in close proximity to a drive coil, such as, for example, a bi-directional drive coil as described in U.S. Pat. No. 6,824,060, which is owned by the assignee of the instant invention and is incorporated by reference. When powered, the drive coil causes the scan motor to oscillate back and forth. A laser beam impinging on the mirror is then moved back and forth to create a scan line that can be used to read dataforms, such as, for example, barcodes.

The scan motor is properly aligned within the scan module so that the laser beam reflects off the scan motor's mirror and creates a scan line in a desired direction. In an exemplary retroreflective scan module, the static substrate comprises a pivoting base, that is used to align the scan motor. The scan motor also comprises a chassis having a feature to receive the pivoting base. After the scan motor is aligned correctly, it is secured in place using an adhesive. The retroreflective scan module can be, in some embodiments, an independent scan engine that can be a module of a scanning device.

In an exemplary non-retroreflective scan system implemented in accordance with the invention, the extending member of the spring assembly can be modified to cradle a small mirror. The smaller mirror makes the scan motor even more efficient.

With reference to FIG. 1, there is shown an exemplary block diagram of a device 101 comprising a scan module 100, a processing unit 105 and memory 120 coupled together by bus 125. The modules of device 101 can be implemented as any combination of software, hardware, hardware emulating software, and reprogrammable hardware. The bus 125 is an exemplary bus showing the interoperability of the different modules of the invention. As a matter of design choice there may be more than one bus and in some embodiments certain modules may be directly coupled instead of coupled to a bus 125. The device 101 can be, for example, a laser scanner, a mobile computer, a point of service, etc, and the scan module can be, for example, a retroreflective scan engine 100.

Processing unit 105 can be implemented as, in exemplary embodiments, one or more Central Processing Units (CPU), Field-Programmable Gate Arrays (FPGA), etc. In an embodiment, the processing unit 105 may comprise a plurality of processing units or modules. Each module can comprise memory that can be preprogrammed to perform specific functions, such as, for example, signal processing, interface emulation, etc. In other embodiments, the processing unit 105 can comprise a general purpose CPU that is shared between the scan engine 100 and the device 101. In alternate embodiments, one or more modules of processing unit 105 can be implemented as an FPGA that can be loaded with different processes, for example, from memory 120, and perform a plurality of functions. Processing unit 105 can also comprise any combination of the processors described above.

Memory 120 can be implemented as volatile memory, non-volatile memory and rewriteable memory, such as, for example, Random Access Memory (RAM), Read Only Memory (ROM) and/or flash memory. The memory 120 stores methods and processes used to operate the device 101, such as, data capture method 145, signal processing method 150, power management method 155 and interface method 160.

In an exemplary embodiment of the invention, the device 101 can be a handheld scanner 101 comprising a trigger. When a scanning operation is initiated, for example the trigger is pressed, the scanner 101 begins data capture method 145. An exemplary embodiment of data capture method 145 is described below with reference to FIG. 9. During the data capture method 145, laser light is emitted by the scanner 101, which interacts with a target dataform and returns to the scanner 101. The returning laser light is analyzed, for example the received analog laser light is converted into a digital format, by the scanner 101 using signal processing method 150. Power management method 155 manages the power used by the scanner 101 and interface method 160 allows the scan engine 100 to communicate with the scanner 101.

The exemplary embodiment of FIG. 1 illustrates data capture method 145, signal processing method 150, interface method 160 and power management method 155 as separate components, but those methods are not limited to this configuration. Each method described herein in whole or in part can be separate components or can interoperate and share operations. Additionally, although the methods are depicted in the memory 120, in alternate embodiments the methods can be incorporated permanently or dynamically in the memory of processing unit 105.

Memory 120 is illustrated as a single module in FIG. 1, but in some embodiments image scanner 100 can comprise more than one memory module. For example, the methods described above can be stored in separate memory modules. Additionally, some or all parts of memory 120 may be integrated as part of processing unit 105.

Figure 2:
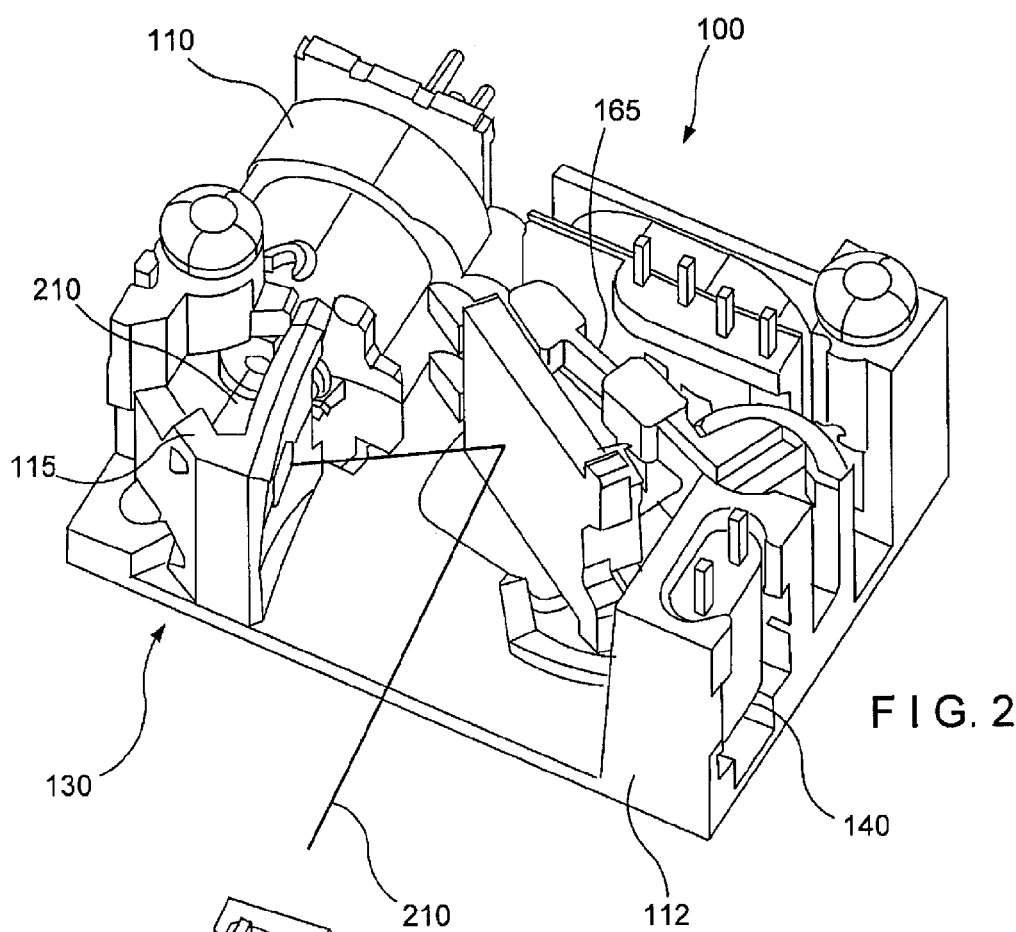
FIGS. 2 and 3 illustrate three-dimensional views of an exemplary scan engine implemented in accordance with an embodiment of the invention.
Figure 3:
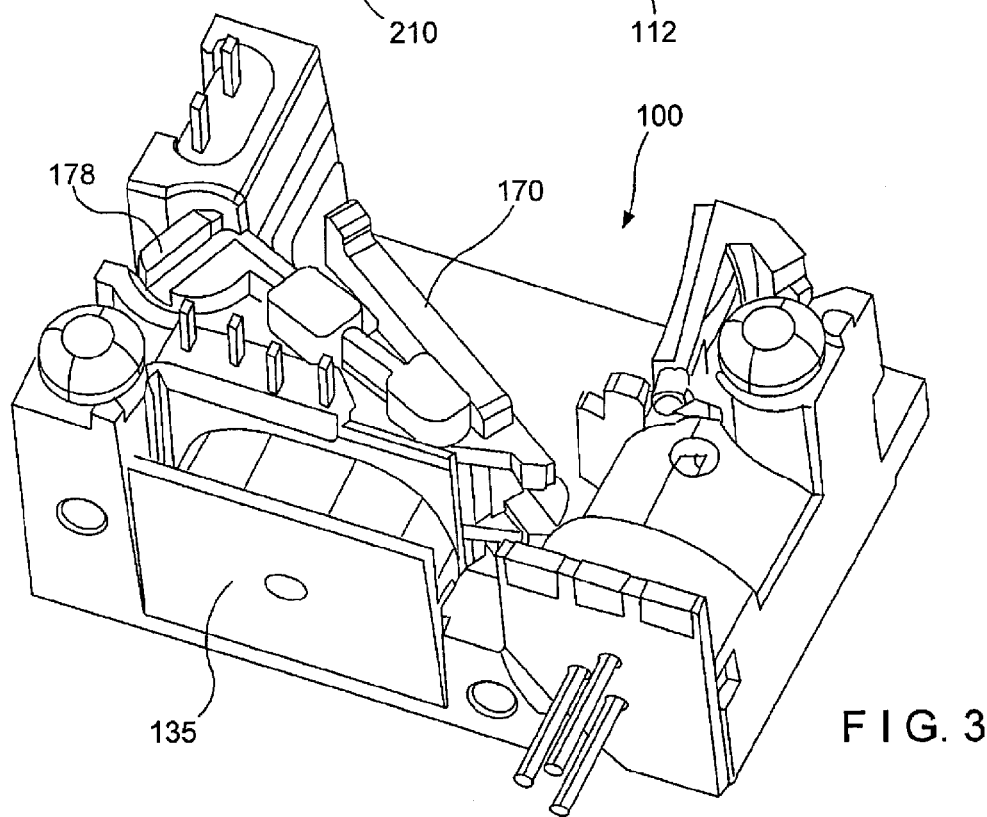

FIGS. 2 and 3 illustrate a three-dimensional view of a scan engine 100, implemented in accordance with an embodiment of the invention. The scan engine 100 can be used as the scan engine 100 of FIG. 1. FIG. 2 illustrates a laser module or assembly 110 positioned in the upper left hand corner of the scan engine 101 chassis 112. During an exemplary operation of data capture method 145, the laser assembly 110 emits a laser beam 210 that is reflected by a fold mirror 115. The laser beam 210 goes through a hole in the collection mirror 130 and impinges on the scan mirror 170. The scan mirror 170 is part of a scan motor 165, which moves back and forth creating a scan line for reading dataforms.

After interacting with a dataform, some of the emitted laser light returns to the scan engine 100. The returning light is received by the scan mirror 170 and is reflected towards the collection mirror 130. The collection mirror 130, which can have a concave shape, such as, for example, an off axis parabola shape, spherical shape, etc., collects the returning light and concentrates it towards the sensor 140. In alternate embodiments, the returning light can be concentrated towards a sensor by a lens. The sensor 140 is positioned in a receiving structure located on the right side of the chassis 112 and in front of the scan motor 165. The sensor 140 can be implemented, in an exemplary embodiment, as a photodiode. The returning light is detected by the sensor 140 which produces a corresponding electrical signal. The electrical signal is analyzed and the target dataform is decoded.

Figure 11:
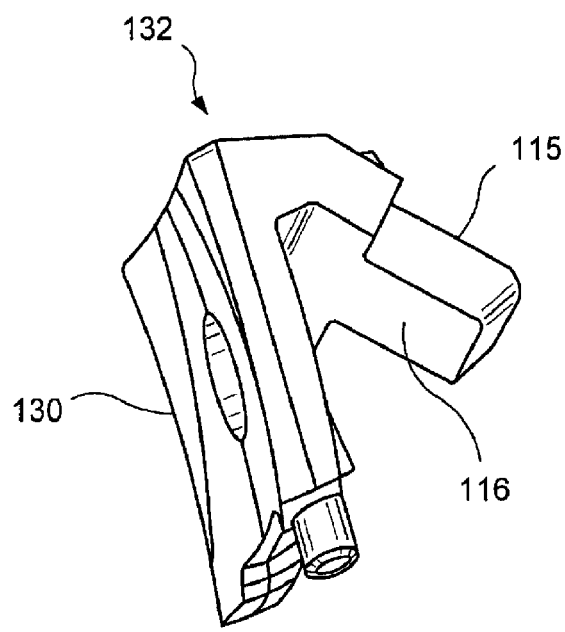
FIGS. 11-12 illustrate an exemplary mirror module implemented according to an embodiment of the invention.
Figure 12:
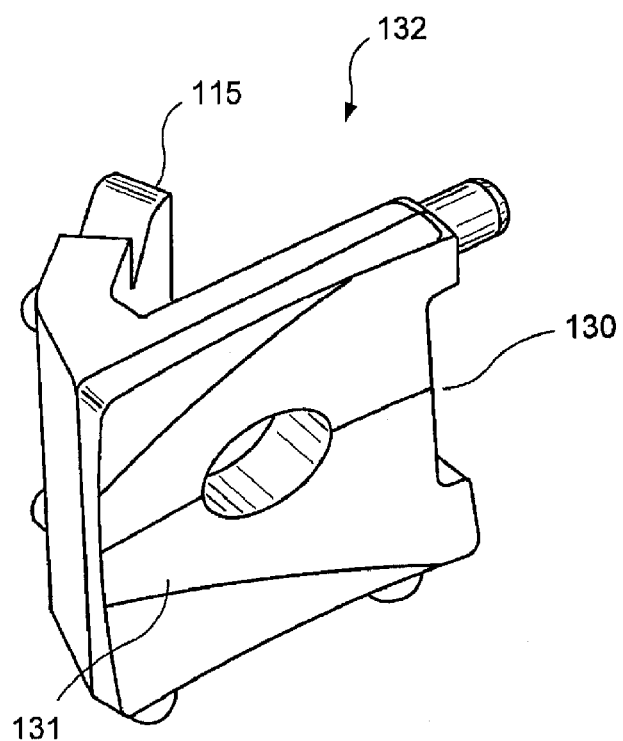

In the exemplary scan engine 100, the fold mirror 115 and the collection mirror 130 are constructed as one mirror module 132. FIGS. 11 and 12 illustrate different views of the mirror module 132. The fold mirror 115 comprises a reflective surface 116 and the collection mirror 130 comprises a reflective surface 131. The fold mirror 115 extends behind the collection mirror 130 from one side of the collection mirror 130. In an embodiment, the mirror module 132 is molded as one piece, but in alternate embodiments a single piece mirror module can be assembled by coupling a fold mirror to the back of a collection mirror. The mirror module 132 can also comprise one or more dowels or pegs, which are used to secure the mirror module 132 in receiving structures on the chassis 112. Exemplary mirror module 132 comprises two dowels 134, 137 on the bottom of the collection mirror 130, and one peg 133 on the top right side of the collection mirror 130. These dowels 134, 137 and peg 133 are placed in corresponding receiving structures in the chassis 112, and can be further secured using an adhesive.

Some known scan modules, comprise collection/fold mirror modules, as one piece, but the fold mirror is insert molded to the surface of the collection mirror rather than extending behind the collection mirror. In other known scan modules, the fold mirror is a separate piece that is positioned behind the collection mirror, and a laser is reflected by the fold mirror towards a scan mirror through a hole in the collection mirror. Both the hole in the collection mirror and the fold mirror molded on the surface of the collection mirror reduce the collection area of the scan module, but the hole in the collection mirror can be made smaller than a fold mirror molded on the collection mirror. Therefore, a fold mirror on the collection mirror reduces the collection area of the scan module more than a hole in the collection mirror.

Referring to the exemplary scan engine 100 illustrated in FIGS. 2 and 3, if the fold mirror is placed on the collection mirror, the collection mirror would be moved to the left and there would not be a lot of room for the collection mirror. The laser lens assembly would vignette collected light and the effective collection area would be reduced. If the fold mirror and the collection mirror were not attached, the collection mirror would be moved to the right to accommodate the separate fold mirror and any receiving structure for coupling the fold mirror to the chassis 112. Moving the collection mirror to the right causes the collection mirror to vignette collected light and effectively reduces collection area. Thus, the single piece mirror module 132 gives the scan engine 100 the space and reflective area to produce an excellent collection area.

Known scan modules are designed with scan motors having springs or flexures made of mylar or metal that oscillate the scan mirror. These scan motors work well, but they have some limitations including a relatively large amount of space required for the spring, clamps, mounting bracket, mirror and magnet; and they are made of a large number of small parts that are assembled, adding to part and manufacturing costs.

Known mylar or metal scan motors have a mirror positioned perpendicular to the plane of the flexure. This is done to reduce twisting of the flexure during operation. If the flexure twists, the laser impinging on the scan mirror may create a curved scan line, which negatively affects a scanner's performance. Unfortunately, positioning the mirror perpendicular to the flexure, places the mirror further from the center of rotation. Thus, during normal operation, when the mirror is oscillating, the mirror needs more open space to avoid hitting other parts of the scan module. In addition, there is more translation of the mirror when it is perpendicularly mounted, so the mirror has to be bigger to avoid moving out of the optical path at the ends of its travel. Only part of the mirror is used to collect light at any time, so the collection area is smaller than the area of the scan mirror.

A scan module using an injection molded scan motor, has a mirror that can be placed much closer to the center of rotation because an injection molded flexure is less prone to twisting than mylar or metal springs. Thus, even though the mirror is not mounted perpendicular to the plane of the flexures, there is much less translation as it oscillates. As a result of the mirror's positioning, more of the mirror's reflective surface is working throughout the entire scan angle. Thus, a scanner using an injection molded flexure can have a larger collection area for a given sized mirror.

Additionally, since the flexures are not mounted perpendicular to the mirror, the flexures do not protrude out as far behind the scan mirror as in known designs. This allows the mirror to be moved towards the back of the scan module, where it is possible to rotate the mirror to present more of its reflective surface to incoming light. In other words, the mirror is more parallel to the front plane of the scan module than in similar known scan modules having mylar or metal springs, so the projected area is larger and the collection area of the module increases.

Figure 4:
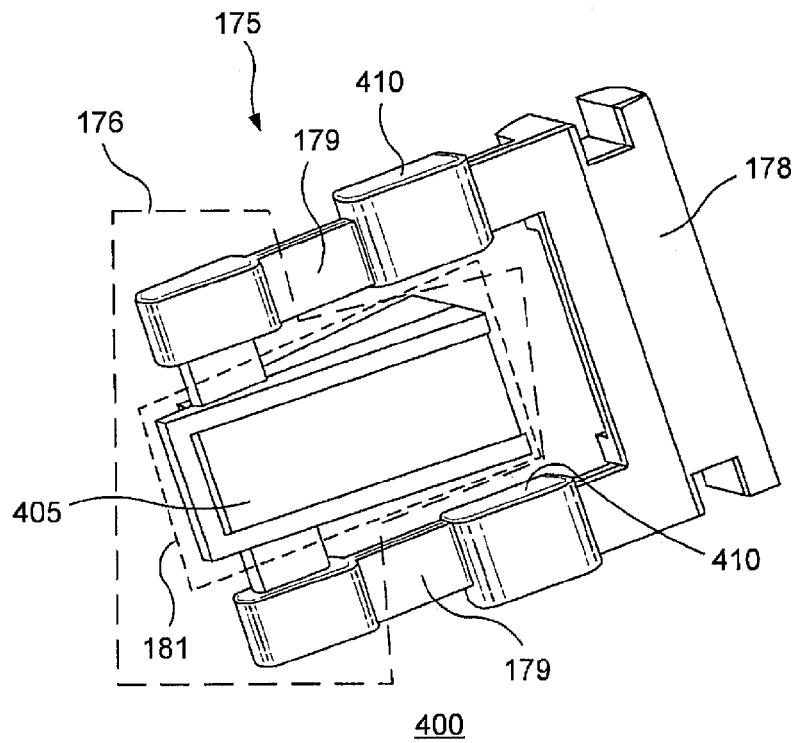
FIGS. 4 and 5 illustrate three-dimensional views of an exemplary spring assembly implemented in accordance with an embodiment of the invention.
Figure 5:
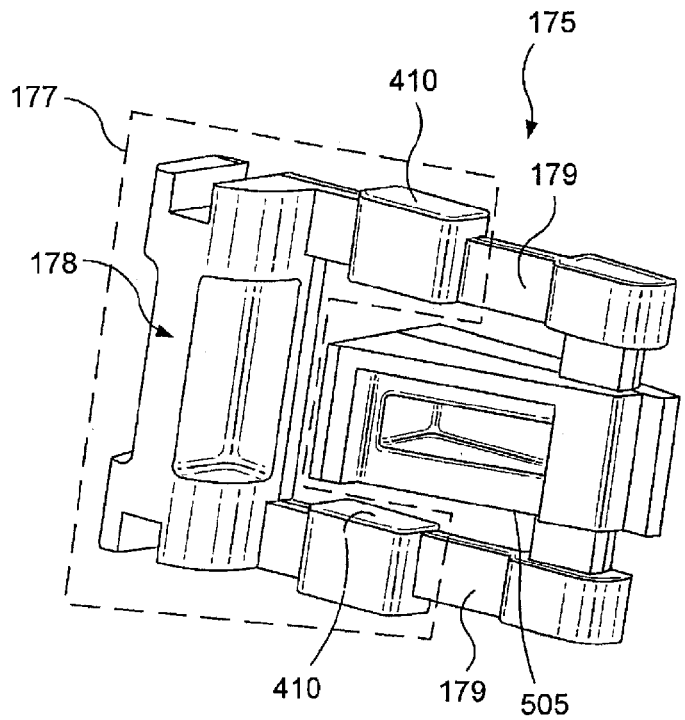

The scan motor 165 of exemplary scan engine 100 comprises a spring module 175, a scan mirror 170 and a magnet 180. FIGS. 4 and 5 illustrate an exemplary spring module 175. The exemplary spring module 175 comprises a static substrate 177 and a dynamic substrate 176 coupled together by a flexible spring 179. In one exemplary embodiment, the flexible spring 179 is made of a pair of silicone springs 179 that are over molded 410 to the dynamic substrate 176 and the static substrate 177. The springs 179 are liquid injection molded to the substrates 176, 177. In alternate embodiments, the flexible springs 179 can be made of thermoplastic using an injection molding process, or alternatively, the springs 179 and the dynamic substrate 176 can be made of an LIM material.

The exemplary static and dynamic substrates 176, 177 are made of a thermoplastic material. The static substrate 177 comprises a pivoting base 178 that is used to properly align and secure the scan motor 165 to the scan engine 100 chassis. The dynamic substrate 176 comprises an extending member 181 that receives the magnet 180 and the scan mirror 170.

The extending member 181 has a first side 405 and a second side 505. The first side 405 comprises a cradle for receiving the scan mirror 170, and the second side 505 comprises a receiving structure for receiving the magnet 180. The extending member 181 has a triangular or wedge-like shape. The extending member 181 starts at one end of the spring module 175 and gets larger as it extends from the dynamic substrate 176 towards the static substrate 177.

Figure 6:
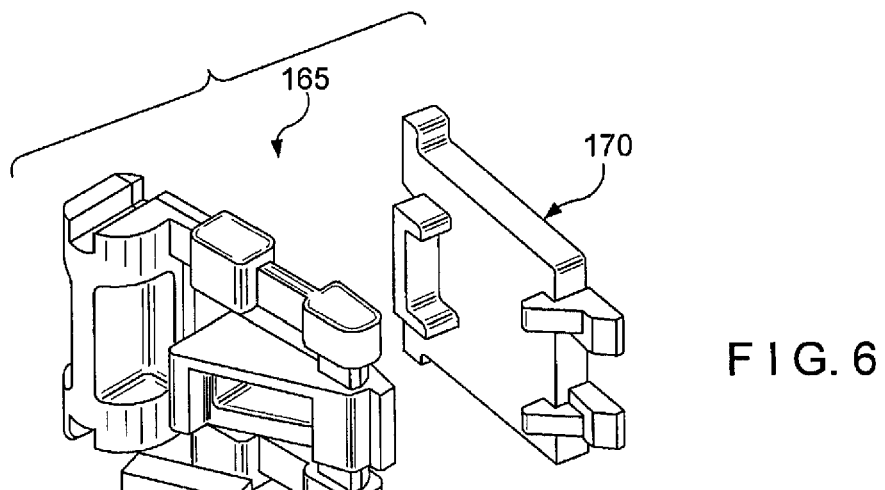
FIGS. 6-8 illustrate three-dimensional views of an exemplary scan motor implemented in accordance with an embodiment of the invention.
Figure 7:
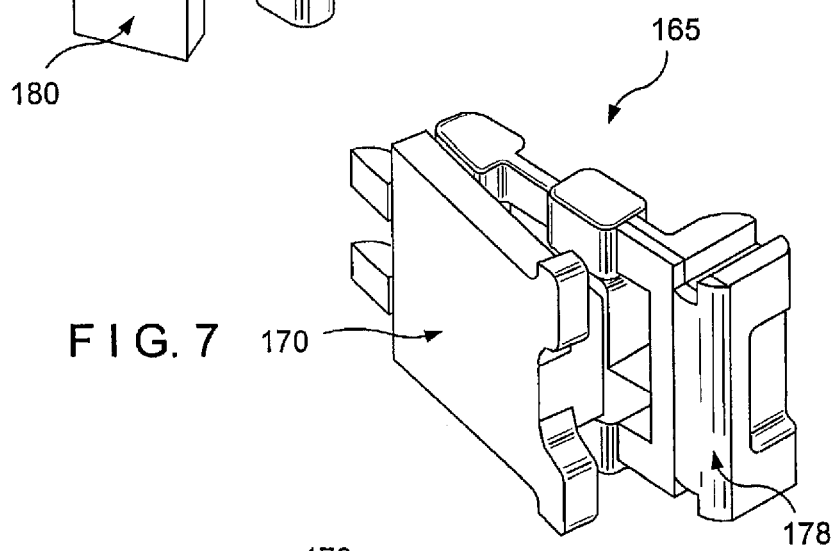
Figure 8:
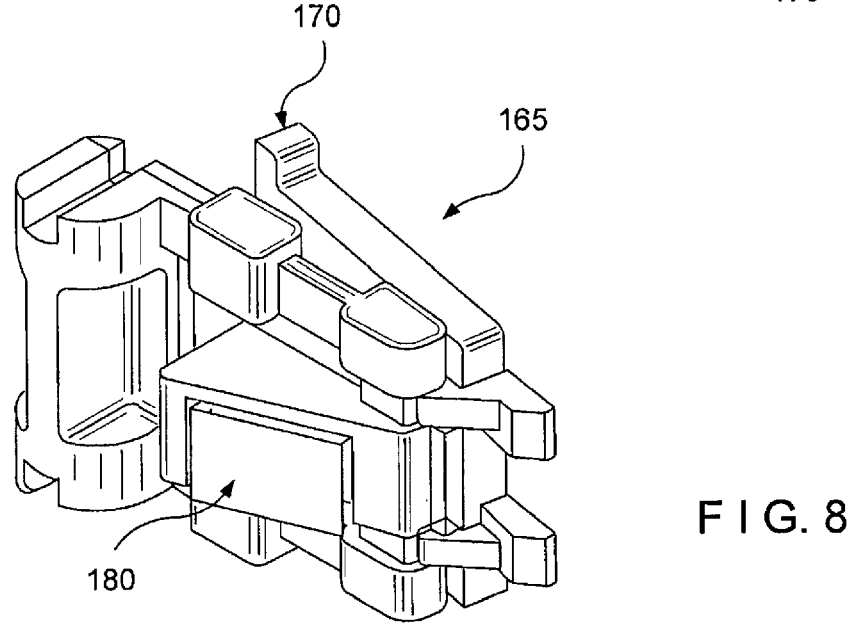

FIGS. 6 through 8 illustrate the scan motor 165. A magnet 180 is positioned in the receiving structure located on the second side 505 of the extending member 181. The mirror 170 is coupled to the first side 405 of the extending member 181. The mirror 170 comprises a receiving structure that receives the first side 405 of the extending member 181. The magnet 180 and the mirror 170 can be secured to the extending member 181 using an adhesive.

In an alternate embodiment, the flexible springs 179 and the dynamic substrate 176 can be molded as one unit that is made of the same material. For example the combined unit can be made of silicone or thermoplastic.

Returning to FIGS. 2 and 3, the scan motor 165 is positioned in proximity to the drive coil 135. The magnet 180 coupled to the scan motor 165 interacts with the magnetic field created by the drive coil 135 and oscillates the scan motor 165 when the drive coil 135 is excited.

An exemplary scan engine 100, implemented in accordance with the invention, comprising a single piece mirror module 132 as illustrated in FIGS. 11 and 12 and a scan motor 165 as illustrated in FIGS. 6, 7 and 8 can have a collection area with almost 50% more collection area than known scan modules with a similar volume and shape. Additionally, the scan engine 100 can be manufactured for significantly less cost because there are fewer pieces and, as described above, the injection molded scan motor 165 can be made for less money than known scan motors.

The layout of scan engine 100 is similar to some larger scan modules, but since larger scan modules have more space, they can include parts that could not be implemented in a smaller sized volume. For example, larger scan modules have more room to use a large mylar flexure to drive its scan mirror, and its collection mirror can have an adjustment to direct light to a photodiode.

The performance to volume ratio, or packing efficiency, of a scan module can be used to compare different scan modules. For example, the relative volume a scan module occupies is divided by the scan module's collection area to obtain a measurable metric. The smaller the number, the higher the packing efficiency of the scan module. A known large scan module has a volume of 1.91 $in^3$ and a collection area of 0.28 $in^2$, thus having a packing efficiency of 7. A known small scanner having a shape similar to scan engine 100, has a volume of 0.205 $in^3$, and a collection area of 0.034 $in^2$, thus having a packing efficiency of 6. Exemplary scan engine 100 has a volume of 0.205 $in^3$ and a collection area of 0.050 $in^2$, thus having a packing efficiency of 4. Therefore, the packing efficiency of scan engine 100 is 50% better than a similarly sized scan module and roughly 100% better than a large scan module.

While scan engine 100 is relatively small, having a volume of 0.205 $in^3$, the layout of the scan engine 100 and the modules that make up the scan engine 100 are not limited to small scan systems. In other embodiments of the invention, the modules and layout of the scan engine 100 can be modified to work with larger scan systems, providing those systems with the same reliability, performance and cost benefits.

Figure 9:
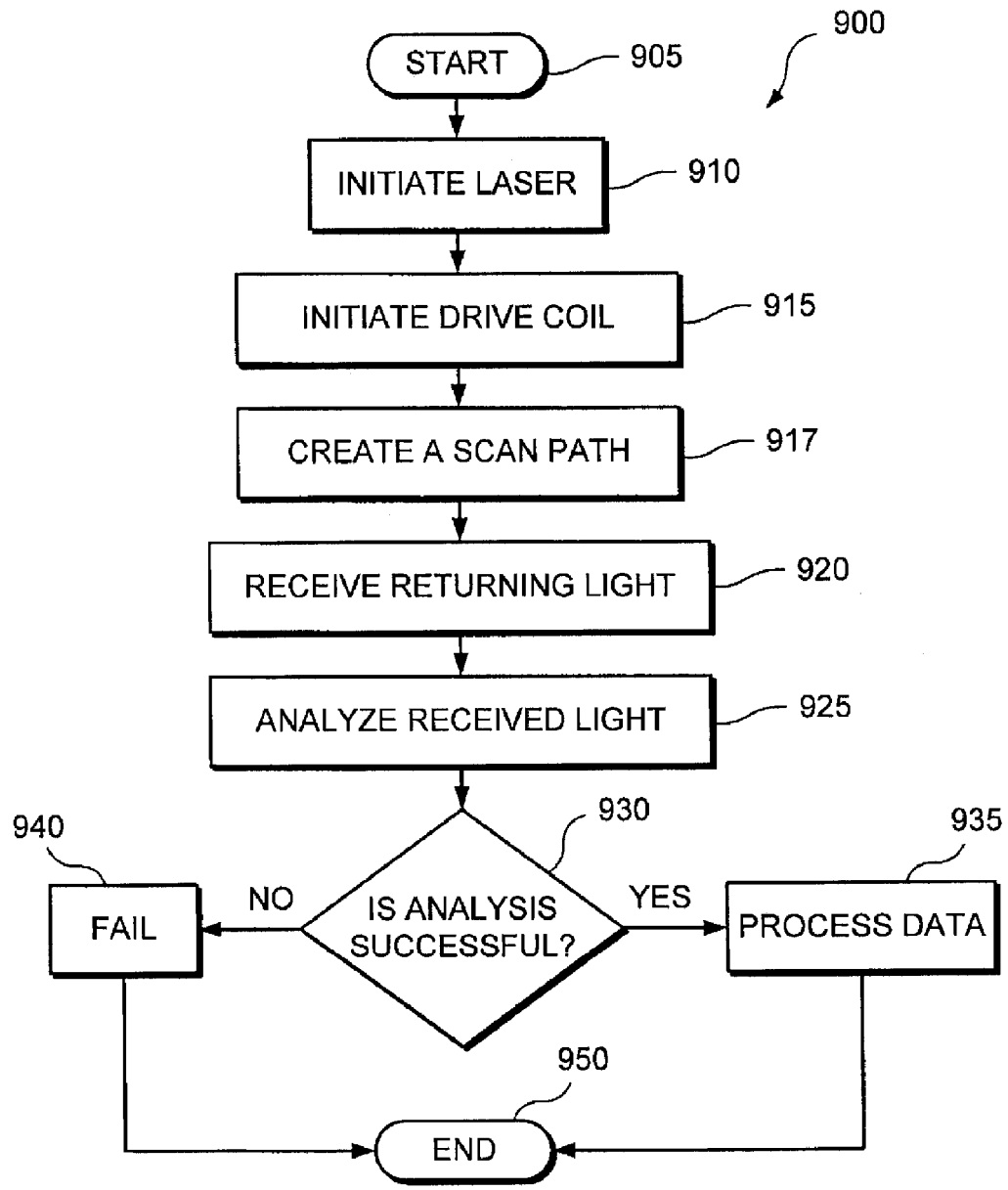
FIG. 9 illustrates an exemplary data capture method implemented according to an embodiment of the invention.

FIG. 9 illustrates an exemplary embodiment of a method 900 for scanning dataforms. Reference to device 101 is made in the description of method 900. The steps of method 900 and other methods described herein are exemplary and the order of the steps may be rearranged. Data capture method 900 begins with start step 905. In an exemplary embodiment, the method 900 begins when the device 101, for example a scanner 101 receives power, for example, when a trigger or button on the scanner 101 is pressed. The method 900 may also be initiated by a command from another program running on the device 101. The device operator is normally aiming the device 101 at a target dataform when the data capture method 900 is initiated.

Figure 10:
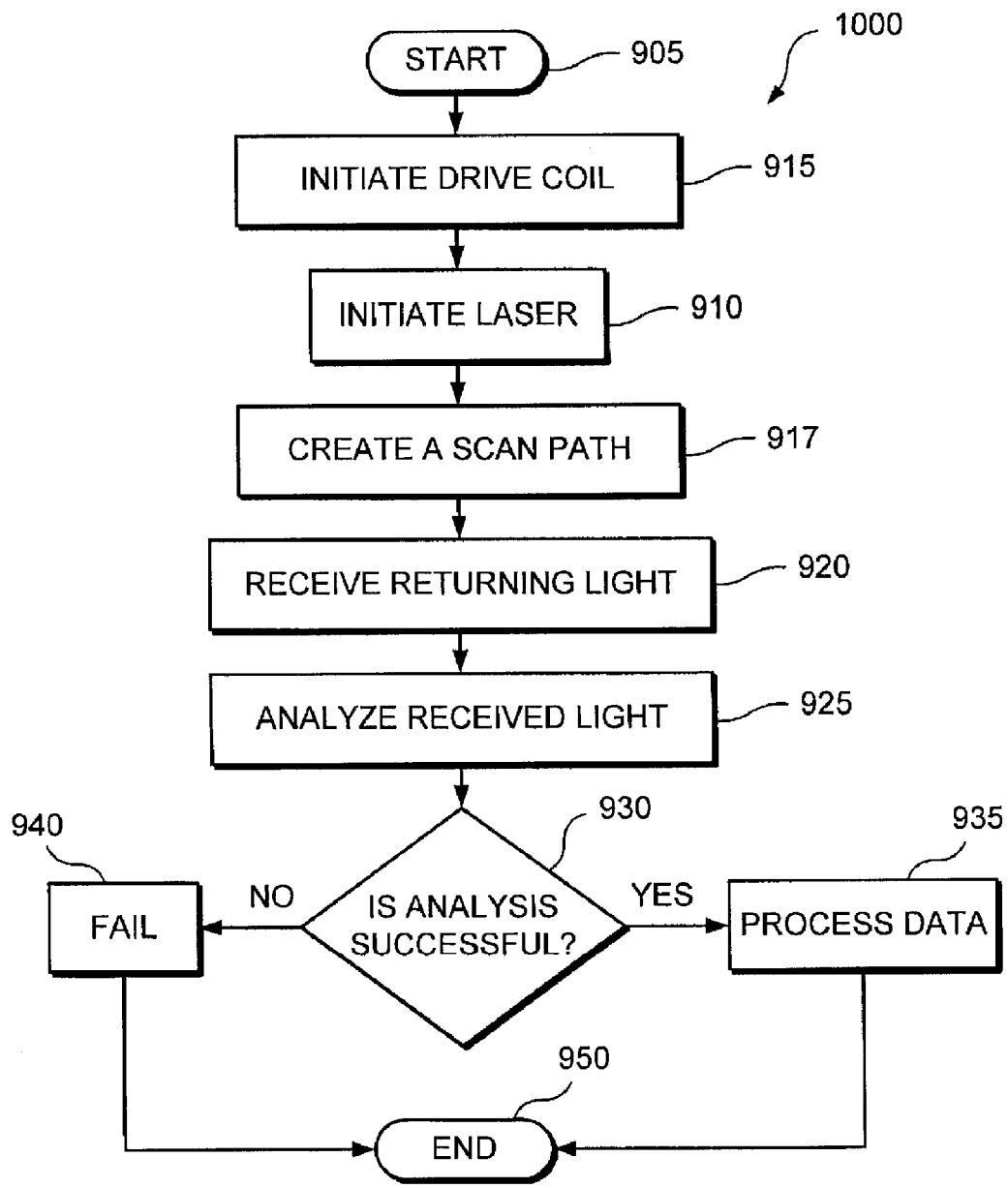
FIG. 10 illustrates an alternate data capture method implemented according to an embodiment of the invention.

Processing proceeds from step 905 to step 910, where the scanner 101 initiates a laser 110. The laser strikes a fold mirror 115 and is directed towards the scan mirror 170. About or at the same time, in step 915, the scanner 101 initiates the drive coil 135 by providing power to the drive coil 135. The magnet 180 reacts to the magnetic field created by the drive coil 135 and begins to oscillate the scan motor 165. As a result, the laser light impinging on the scan mirror 170 moves back and forth, creating a scan line. FIG. 10 illustrates data capture method 1000, which is an alternate embodiment of method 900, where step 915 occurs before step 910. Meaning, the drive coil 135 is initiated before the laser 110 is initiated.

The emitted laser light of the scan line interacts with the dataform and, in step 920, the scanner 101 receives any light that returns to the scanner 101. For example, the returning light is reflected by the scan mirror 170 towards a collection mirror 130. The collection mirror directs the returning light towards a sensor. Since the scan mirror 170 is moving back and forth, the field of view of the scanner 101 also moves back and forth.

Following step 920, in step 925, the received light is analyzed and the target dataform is decoded. In step 930, if the analysis is successful, processing proceeds to step 935, where the decoded data is further processed. For example the data can be transmitted to another device. Following step 935, processing of method 900 proceeds to step 950 where the method 900 ends. The scanner 101 may be in a standby mode, ready to process another dataform.

Returning to step 930, if the scanner 101 does not successfully decode the target dataform, processing proceeds to step 940. In some embodiments, the scanner 101 does nothing and/or times out, and ends in step 950, but in other embodiments the scanner 101 can emit an audible fail indicator to the scanner operator, transmit a fail signal to an attached device, etc. Still in other embodiments, the scanner 101 continues steps 910 through 925 until the dataform is successfully read or the operator removes power to the scan engine, for example, by releasing the trigger, or in other embodiments, the scanner can time out.

While the exemplary scan motor has been described as part of a retroreflective scan system, the scan motor of the invention can also be used in a reduced sized non-retroreflective scan system. The relatively large mirror can be replaced by a smaller mirror and the angle between the flat plane of the mirror and the spring can be properly adjusted, for example to 45 degrees, by adjusting the width of the wedge shaped extending member. Additionally, the structure of the static substrate can be modified so that the scan module can be secured to a scan module coupled to a circuit board. An exemplary scan motor of the invention can help to increase the efficiency of the non-retroreflective scan system, since the exemplary scan motor uses less power.

While there have been shown and described and pointed out fundamental novel features of the invention as applied to preferred embodiments thereof, it will be understood that various omissions and substitutions and changes in the form and detail of the disclosed invention may be made by those skilled in the art without departing from the spirit of the invention. It is the intention, therefore, to be limited only as indicated by the scope of the claims appended hereto.

What is claimed:

1. A scan module comprising:
   a scan motor,
   a laser;
   a sensor; and
   a mirror module including (a) a collection mirror having an opening and (b) a fold mirror having a first end physically coupled to the collection mirror, a second end of the fold mirror being separated by a gap from the collection mirror.

2. The scan module of claim 1, further comprising:
   a drive coil driving the motor in at least one direction.

3. The scan module of claim 1, wherein the scan motor includes:
   a spring module including (a) a static substrate and (b) a dynamic substrate comprising an extending member, the static substrate and the dynamic substrate being coupled together by a molded flexible spring;
   a magnet coupled to a first side of the extending member; and
   a reflective element coupled to a second side of the extending member.

4. The scan module of claim 3, wherein the spring module is made of the same material.

5. The scan module of claim 4, wherein the motor is molded in at least one molding step.

6. The scan module of claim 3, wherein the magnet is positioned at or near a center of rotation of the spring.

7. The scan module of claim 3, further comprising:
   a drive coil,
   wherein a magnetic axis of the magnet is positioned approximately perpendicular to the magnetic axis of the coil.

8. The scan module of claim 3, wherein a volume of the scan module is less than 0.35 in$^3$.

9. The scan module of claim 3, wherein a packing efficiency of the scan module is less than 5.

10. The scan module of claim 3, wherein the sensor is positioned in a chassis opposite the collection mirror and in front of the scan motor.

11. A method for scanning an object comprising:
    driving a scan motor;
    directing a laser at a fold mirror of a mirror module, the mirror module including (a) a collection mirror having an opening and (b) a fold mirror having a first end physically coupled to the collection mirror, a second end of the fold mirror being separated by a gap from the collection mirror;
    creating a scan pattern; and
    concentrating light returning from the object to a sensor.

12. The method of claim 11, wherein the creating step further includes the scan motor reflecting laser light reflected by the fold mirror, the scan motor comprising:
    a spring module including a static substrate and a dynamic substrate comprising an extending member, the static substrate and the dynamic substrate being coupled together by a molded flexible spring,
    a magnet coupled to a first side of the extending member, and
    a reflective element coupled to a second side of the extending member.

13. The method of claim 12, wherein the driving step further comprises driving the scan motor in at least one direction.

14. The scan module of claim 1, wherein the second end extends from the collection mirror at the same angle as the first end.

* * * * *

UNITED STATES PATENT AND TRADEMARK OFFICE
CERTIFICATE OF CORRECTION

PATENT NO. : 7,441,705 B2  
APPLICATION NO. : 11/857776  
DATED : October 28, 2008  
INVENTOR(S) : Shepard et al.

It is certified that error appears in the above-identified patent and that said Letters Patent is hereby corrected as shown below:

In Column 1, Line 9, after filed insert -- on --.

In Column 4, Line 1, delete "retuning" and insert -- returning --.

Signed and Sealed this

Twenty-fourth Day of November, 2009

David J. Kappos
*Director of the United States Patent and Trademark Office*